United States Patent
Yasuda

(10) Patent No.: US 11,461,882 B2
(45) Date of Patent: Oct. 4, 2022

(54) IMAGE PROCESSING APPARATUS, IMAGE PROCESSING METHOD, COMPUTER-READABLE MEDIUM FOR PERFORMING IMAGE PROCESSING USING REDUCED IMAGE

(71) Applicant: CANON KABUSHIKI KAISHA, Tokyo (JP)

(72) Inventor: Takayuki Yasuda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 17/133,262

(22) Filed: Dec. 23, 2020

(65) Prior Publication Data

US 2021/0201457 A1    Jul. 1, 2021

(30) Foreign Application Priority Data

Dec. 27, 2019  (JP) .............................. JP2019-239280

(51) Int. Cl.
*G06T 5/00* (2006.01)
*G06T 5/50* (2006.01)

(52) U.S. Cl.
CPC ...... *G06T 5/50* (2013.01); *G06T 2207/20016* (2013.01)

(58) Field of Classification Search
CPC .... G06T 2207/20016; G06T 3/40; G06T 5/50
See application file for complete search history.

(56) References Cited

U.S. PATENT DOCUMENTS

| 2005/0259740 | A1* | 11/2005 | Kobayashi | H04N 19/182 375/E7.181 |
| 2007/0223033 | A1* | 9/2007 | Onno | H04N 19/615 358/1.15 |
| 2011/0013082 | A1* | 1/2011 | Jung | H04N 7/0125 348/E7.003 |
| 2014/0359494 | A1* | 12/2014 | Clark | G06F 9/452 715/762 |
| 2021/0133956 | A1* | 5/2021 | Chen | G16H 50/20 |

FOREIGN PATENT DOCUMENTS

JP    2009-081596 A    4/2009

* cited by examiner

*Primary Examiner* — Li Liu
(74) *Attorney, Agent, or Firm* — Cowan, Liebowitz & Latman, P.C.

(57) ABSTRACT

Disclosed is an image processing apparatus that generate a plurality of reduced images with different reduction rates from an input image, applies predetermined processing to the reduced images, enlarges the reduced images into their respective original resolutions, and then composes the enlarged images into a composite image. The apparatus applies processing to the input image based on the composite image. The apparatus, depending on a setting, applies the processing to an input image based on the composite image generated from a previous input image.

13 Claims, 10 Drawing Sheets

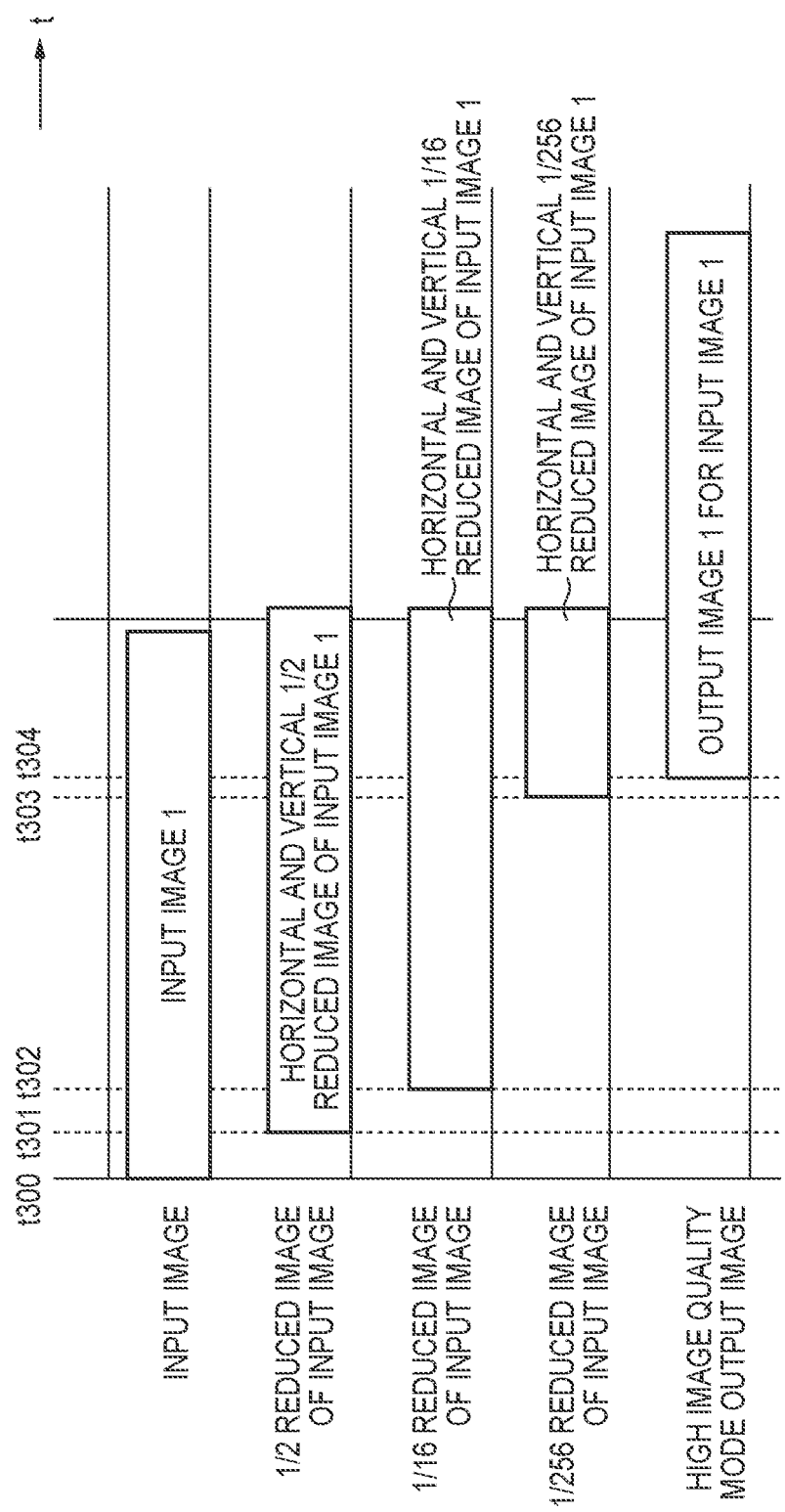

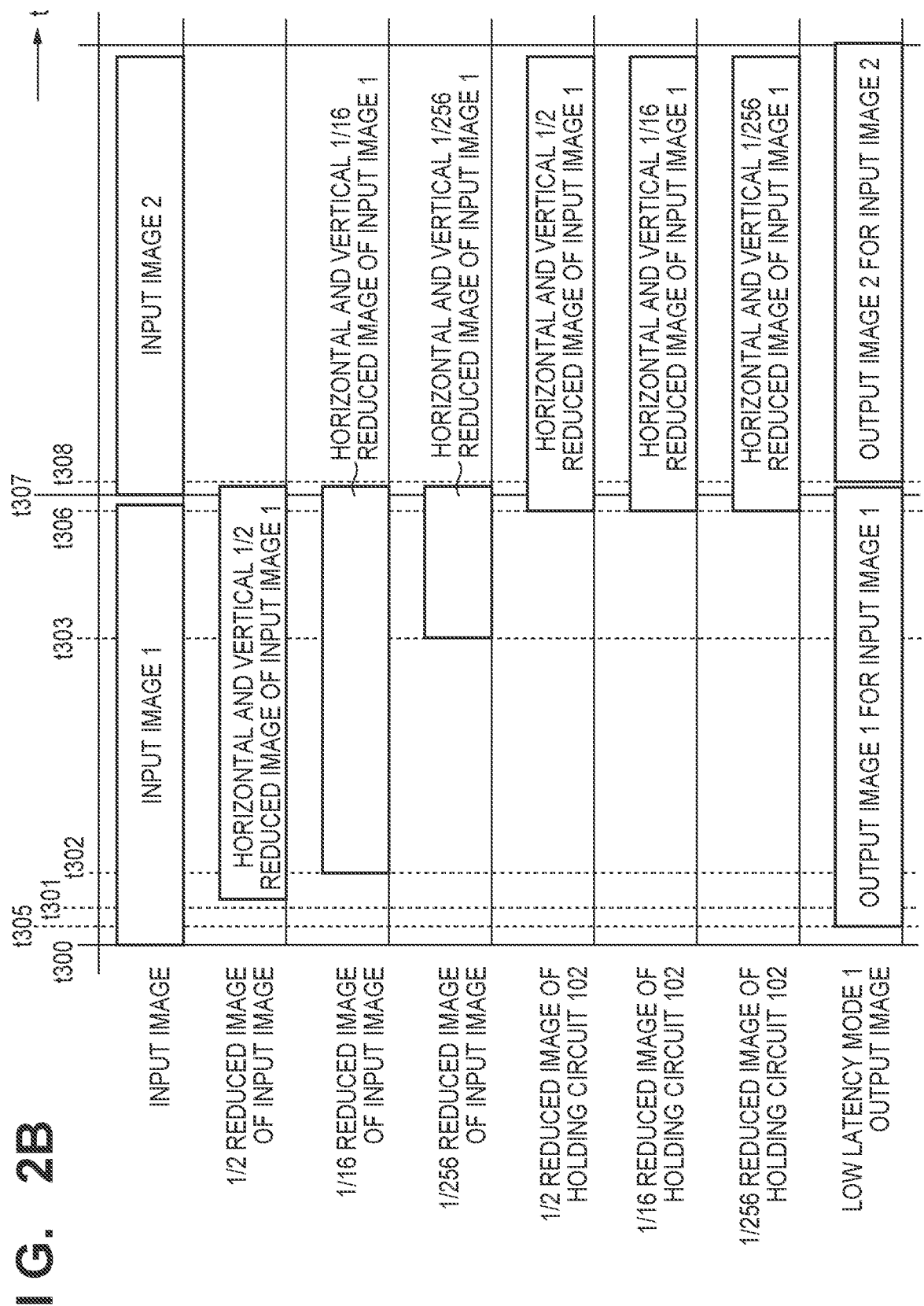

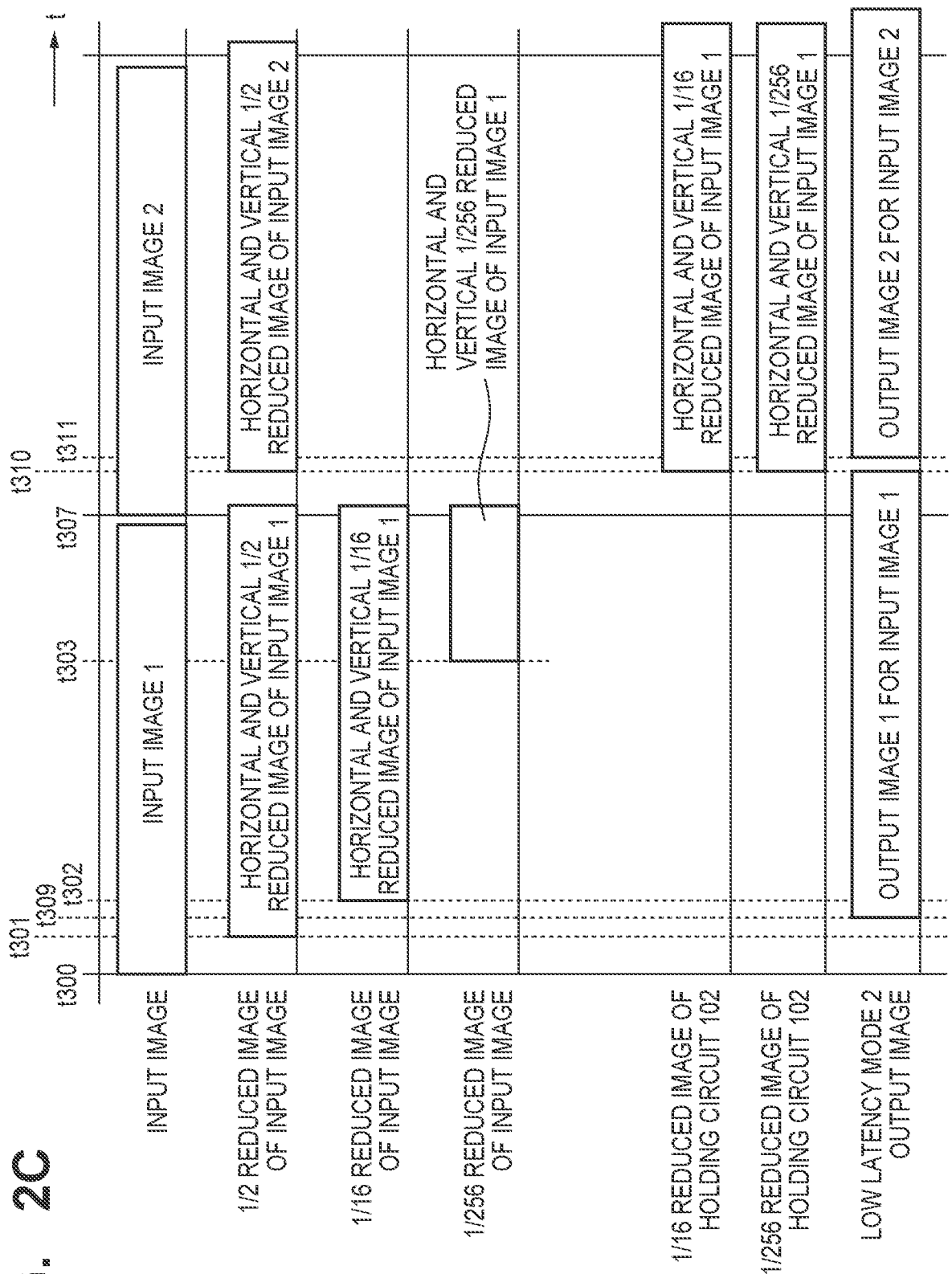

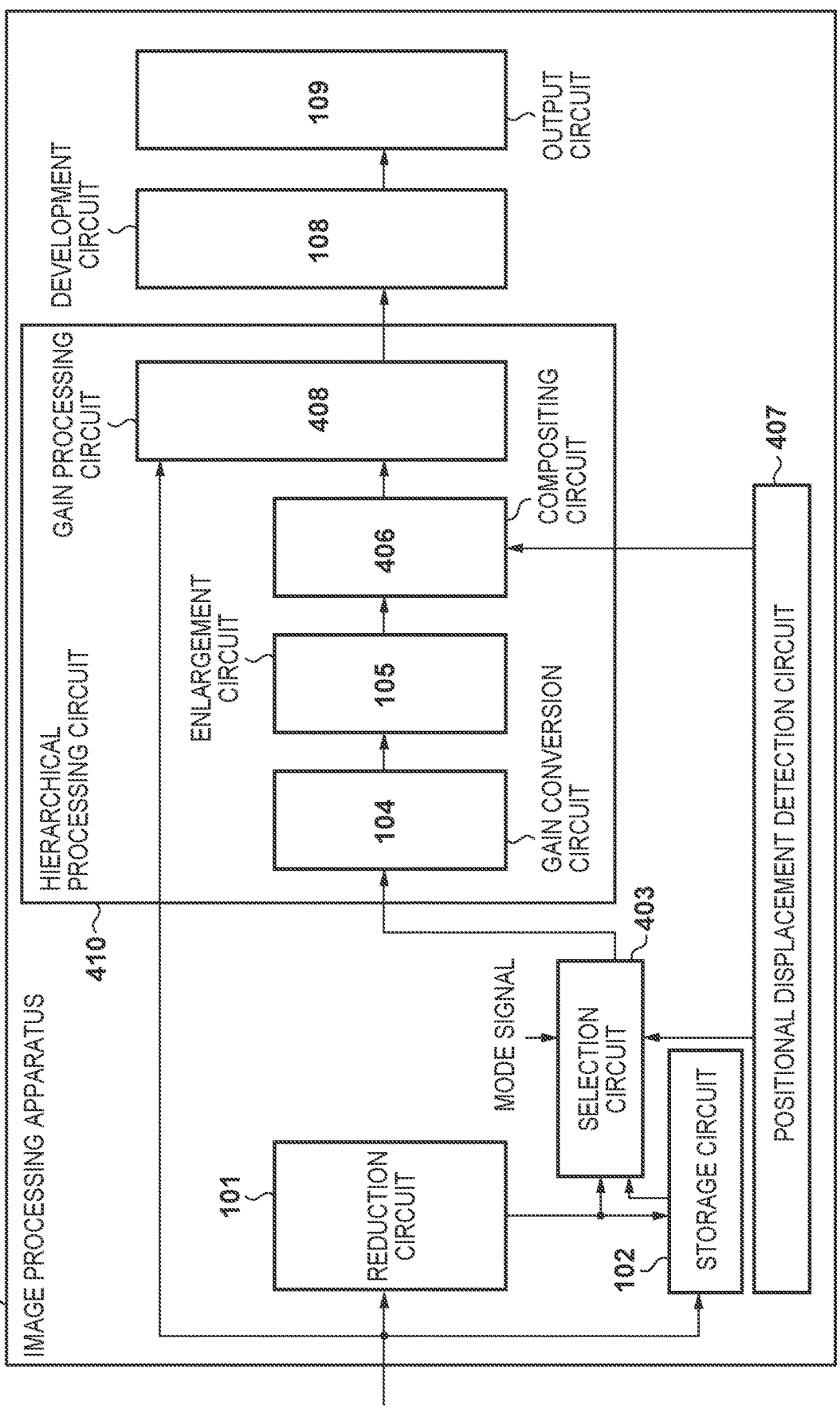

IMAGE PROCESSING APPARATUS, IMAGE PROCESSING METHOD, COMPUTER-READABLE MEDIUM FOR PERFORMING IMAGE PROCESSING USING REDUCED IMAGE

BACKGROUND OF THE INVENTION

Field of the Invention

The present invention relates to an image processing apparatus and an image processing method, and particularly to a technique to increase the speed of hierarchical processing.

Description of the Related Art

Conventionally, for example, multiple-rate processing that uses an original image and a reduced image of the original image is known as hierarchical image processing. In the multiple-rate processing, the more the levels of reduction (the number of times reduction is performed), the longer the processing period.

Japanese Patent Laid-Open No. 2009-81596 discloses that, in order to increase the speed of hierarchical image processing, the hierarchical image processing, which is performed in units of image blocks, is divided in a time direction, and the hierarchical image processing for a plurality of image blocks is performed in a pipeline.

In order to reduce an image in a vertical direction, it is required to wait until all necessary pixel lines are prepared. For example, in the case of reduction to 1/256 in the vertical direction, it is required to wait until all pieces of data corresponding to 256 lines are prepared. However, the technique disclosed in Japanese Patent Laid-Open No. 2009-81.596 cannot shorten a period required for reduction. As a result, for example, when images to which the multiple-rate processing has been applied are used in live-view display, there is a large latency from image capture to display.

SUMMARY OF THE INVENTION

The present invention has been made in view of the aforementioned problem, and an aspect thereof provides an image processing apparatus and an image processing method that are capable of high-speed execution of hierarchical image processing that uses an input image and a reduced image thereof.

According to an aspect of the present invention, there is provided an image processing apparatus comprising: at least one processor and/or circuit configured to function as following units: a reduction unit configured to generate a plurality of reduced images with different reduction rates from an input image; a storage unit configured to store one or more of the plurality of reduced images generated from a previous input image that precedes the input image; a processing unit configured to apply processing to the input image based on composite data that is obtained by compositing plural pieces of enlarged data, wherein the plural pieces of enlarged data are obtained by applying predetermined processing to a plurality of reduced images with different reduction rates and then converting into their respective original resolutions; and a selection unit configured to output, depending on a setting, the plurality of reduced images generated from the input image, with or without one or more of the plurality of reduced images replaced with one or more reduced images stored in the storage unit, to the processing unit.

According to another aspect of the present invention, there is provided an image processing method executed by an image processing apparatus, the image processing method comprising: generating a plurality of reduced images with different reduction rates from an input image; and applying processing to the input image based on composite data that is obtained by compositing plural pieces of enlarged data, wherein the plural pieces of enlarged data are obtained by applying predetermined processing to a plurality of reduced images with different reduction rates and then converting into their respective original resolutions, wherein the applying includes controlling to use, depending on a setting, in place of one or more of the plurality of reduced images generated from the input image, one or more of a plurality of reduced images generated from a previous input image that precedes the input image.

According to a further aspect of the present invention, there is provided a non-transitory computer-readable medium having stored therein a program for causing a computer to function as an image processing apparatus comprising: a reduction unit configured to generate a plurality of reduced images with different reduction rates from an input image; a storage unit configured to store one or more of the plurality of reduced images generated from a previous input image that precedes the input image; a processing unit configured to apply processing to the input image based on composite data that is obtained by compositing plural pieces of enlarged data, wherein the plural pieces of enlarged data are obtained by applying predetermined processing to a plurality of reduced images with different reduction rates and then converting into their respective original resolutions; and a selection unit configured to output, depending on a setting, the plurality of reduced images generated from the input image, with or without one or more of the plurality of reduced images replaced with one or more reduced images stored in the storage unit, to the processing unit.

Further features of the present invention will become apparent from the following description of exemplary embodiments (with reference to the attached drawings).

BRIEF DESCRIPTION OF THE DRAWINGS

FIG. 2A to FIG. 2D are timing charts of the image processing apparatus according to the first embodiment.

FIG. 4 is a block diagram showing an example of a functional configuration of an image processing apparatus according to a second embodiment.

DESCRIPTION OF THE EMBODIMENTS

Figure 1:
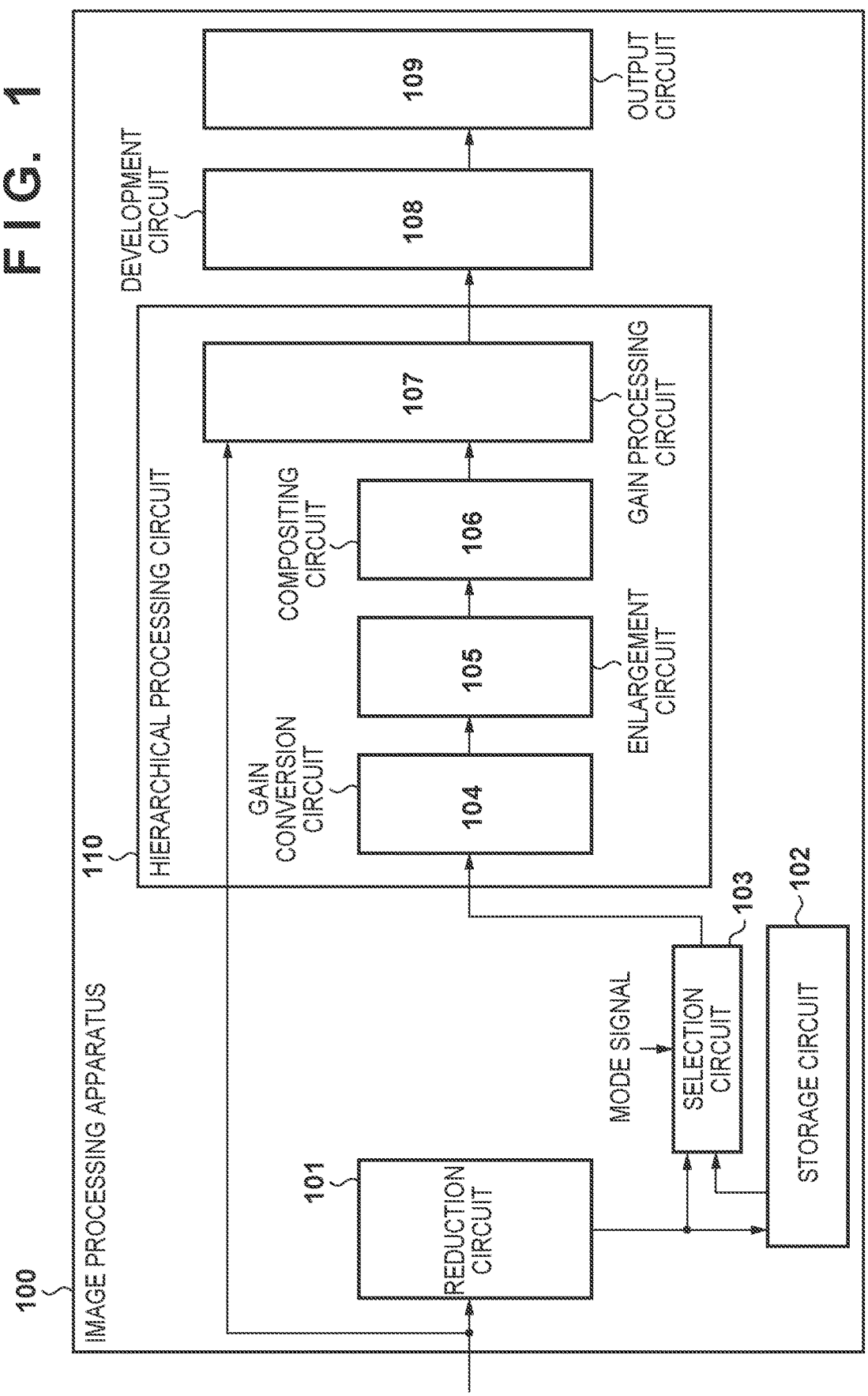
FIG. 1 is a block diagram showing an example of a functional configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments will be described in relation to a case where the present invention is implemented on a digital single-lens reflex camera (DSLR). However, the present invention is applicable to arbitrary electronic devices that have an image capture function. Such electronic devices include a video camera, a computer device (e.g., a personal computer, a tablet computer, a media player, and a PDA), a mobile telephone device, a smartphone, a game device, a robot, a drone, and a dashboard camera. These are examples, and the present invention is also applicable to other electronic devices.

First Embodiment

FIG. 1 is a block diagram showing an example of a functional configuration of an image processing apparatus 100 according to a first embodiment. When the image processing apparatus 100 is implemented on, for example, a computer device, functional blocks other than a storage circuit 102 can be realized by one or more processors reading in a program stored in a nonvolatile memory and the like into a memory and executing the program, Note that below, it is assumed that each functional block is realized by a hardware circuit, such as an ASIC and an FPGA. Furthermore, the entire image processing apparatus 100 may be configured as an SoC. In the following description, processing in which the image processing apparatus 100 acts as a main executor of the operations is realized by a processor or a hardware circuit in reality.

A reduction circuit 101 generates a plurality of reduced images with different resolutions from an input image corresponding to one frame (a current input image). The reduction circuit 101 outputs the generated reduced images to the storage circuit 102 and a selection circuit 103. In the present embodiment, the reduction circuit 101 generates a reduced image by reducing the input image at the same reduction rate in both of a horizontal direction (a raster direction) and a vertical direction. It is assumed here that the reduction circuit 101 generates first to third reduced images by reducing the resolution of the current input image to 1/2, 1/16, and 1/256, respectively, in the horizontal and vertical directions. Here, a reduction rate denotes a degree of decrease in the resolution. That is to say, a small reduction rate means a small decrease in the resolution (i.e., large-scale), and a large reduction rate means a large decrease in the resolution (i.e., small-scale).

The storage circuit 102 is composed of a DRAM, an SRAM, and the like, and holds reduced images that were generated by the reduction circuit 101. The storage circuit 102 holds reduced images that were generated by the reduction circuit 101 with respect to an input image that precedes (e.g., is one frame before) the current input image.

The selection circuit 103 outputs a reduced image(s) stored in the storage circuit 102, in place of one or more of the plurality of reduced images output from the reduction circuit 101, to a hierarchical processing circuit 110. The selection circuit 103 selects the reduced image(s) to be output from the storage circuit 102 in accordance with, for example, a mode set by a mode signal provided from the outside. The mode may be, for example, settable by a user. While it is assumed in the present embodiment that there are four types of modes, namely a high image quality mode and three low latency modes, the number of the types of modes may be any number equal to or larger than two.

When the high image quality mode has been set, the selection circuit 103 outputs the first to the third reduced images (reduced images of the current frame), which are output from the reduction circuit 101, to the hierarchical processing circuit 110, and does not output the reduced images stored in the storage circuit 102 to the hierarchical processing circuit 110.

When a first low latency mode, which has the smallest output latency among the three low latency modes, has been set, the selection circuit 103 selects the first to the third reduced images of the previous input image (e.g., one frame before) that are stored in the storage circuit 102, and outputs them to the hierarchical processing circuit 110.

When a low latency mode 2, which has the next smallest output latency after the low latency mode 1, has been set, with regard to the first reduced image, the selection circuit 103 outputs the reduced image output from the reduction circuit 101 to the hierarchical processing circuit 110. On the other hand, with regard to the second and the third reduced images, the reduced images stored in the storage circuit 102 are selected and output to the hierarchical processing circuit 110 in place of the reduced images output from the reduction circuit 101.

When a low latency mode 3, which has the next smallest output latency after the low latency mode 2, has been set, with regard to the first and the second reduced images, the selection circuit 103 outputs the reduced images output from the reduction circuit 101 to the hierarchical processing circuit 110. On the other hand, with regard to the third reduced image, the reduced image stored in the storage circuit 102 is selected and output to the hierarchical processing circuit 110 in place of the reduced image output from the reduction circuit 101.

In this way, the smaller the latency corresponding to the mode or the acceptable latency, the larger the number of reduced images stored in the storage circuit 102 that are selected by the selection circuit 103 in place of the reduced images output from the reduction circuit 101. The high image quality mode is a mode with the largest corresponding latency.

Next, the hierarchical processing circuit 110 will be described. The hierarchical processing circuit 110 includes a gain conversion circuit 104, an enlargement circuit 105, a compositing circuit 106, and a gain processing circuit 107.

The gain conversion circuit 104 is an example of means for applying predetermined processing to the first to the third reduced images supplied from the selection circuit 103. Here, the predetermined processing is processing for generating gain maps; however, it may be another processing. A gain map is a map that indicates, on a per-pixel basis, a gain (coefficient) for converting a pixel value into a value that is based on the characteristics of predetermined tone mapping (tone conversion). The gain conversion circuit 104 generates first to third reduced gain maps from the first to the third reduced images, and outputs them to the enlargement circuit 105.

The enlargement circuit 105 generates first to third enlarged gain maps (enlarged data pieces) by converting (enlarging) the first to the third gain maps generated by the gain conversion circuit 104 into the same size (resolution) as the input image (or by converting the resolutions of the first to the third gain maps into their original resolutions). Specifically, the enlargement circuit 105:

generates the first enlarged gain map by enlarging the first reduced gain map 2-fold in each of the horizontal and vertical directions, generates the second enlarged gain map by enlarging the second reduced gain map 16-fold in each of the horizontal and vertical directions, and generates the third enlarged gain map by enlarging the third reduced gain map 256-fold in each of the horizontal and vertical directions. The enlargement circuit 105 outputs the generated first to third enlarged gain wraps to the compositing circuit 106.

The compositing circuit 106 composites together the first to the third enlarged gain maps, thereby generating a composite gain map as an example of composite data. The compositing circuit 106 outputs the composite gain map to the gain processing circuit 107. The composite gain map is a map that indicates gains to be applied to respective pixels in the current input image. The gains, which are two-dimensional data of the same resolution as the current input image and which are to be applied to respective pixels in the current input image, are stored as data of coordinates corresponding to the pixels.

The gain processing circuit 107 applies the gains corresponding to the composite gain map to the input image, and outputs the image to which the gains have been applied.

A development circuit 108 applies predetermined development processing to the image which is output from the hierarchical processing circuit 110 (gain processing circuit 107) and to which the gains have been applied. The development processing includes, for example, color complement processing (synchronization processing), white balance processing, scaling processing, and so forth. An image used for display or recording is obtained through the development processing. The development circuit 108 outputs the image to which the development processing has been applied to an output circuit 109. Note that the development circuit 108 is not indispensable.

The output circuit 109 outputs the image to which the development processing has been applied to, for example, an external apparatus for recording or display purpose.

Next, the operations of hierarchical image processing of the image processing apparatus 100 will be described. It is assumed here that input images are moving images with a frame rate of 60 frames per second, and the frame resolution is 2048 pixels horizontally and 1024 pixels vertically. It is also assumed that the input images are, for example, input in real time from an image sensor that captures moving images, or input at the same data rate there as. Furthermore, the moving images are in a so-called RAW format, and each of pixels that compose frames has a value of one color component corresponding to an arrangement pattern of color filters included in the image sensor that was used to capture the moving images. It is assumed here that the image sensor includes color Filters based on the primary-color Bayer arrangement. In the primary-color Bayer arrangement, a row in which red (R) and green (G) are alternatingly arranged in the horizontal direction, and a row in which green (G) and blue (B) are arranged in the horizontal direction, are alternatingly aligned in the vertical direction.

First, the operations of the image processing apparatus 100 for a case where the high image quality mode has been set will be described using a timing chart shown in FIG. 2A. The high image quality mode is a mode in which the image quality is given utmost priority and which has the largest latency.

In the following description, it is assumed that the operation clock frequency of the image processing apparatus 100 is 166 MHz, and the image processing apparatus 100 processes one pixel per clock. Note that the operation dock frequency and the number of pixels that are processed per clock are merely examples, and may have other values. Also, an input image corresponding to the $n^{th}$ frame is denoted as an input image n.

Inputting of an input image 1 to the image processing apparatus 100 is started from time t300. The input image 1 is input to the reduction circuit 101 and the hierarchical processing circuit 110. The reduction circuit 101 starts generating reduced images.

At time t301, the reduction circuit 101 starts outputting a first reduced image of the input image 1 to the storage circuit 102 and the selection circuit 103. A period from t300 to t301 is approximately 0.048 msec. As the first reduced image is an image obtained by reducing the input image to 1/2 in each of the horizontal and vertical directions, the reduction circuit 101 needs to wait until all data pieces corresponding to four horizontal lines are prepared in an internal buffer for the purpose of reduction in the vertical direction. Data pieces corresponding to four horizontal lines, rather than two horizontal lines, are necessary because the target is image data that has been captured using the image sensor that includes the color filters based on the primary-color Bayer arrangement. In order to obtain data pieces corresponding to two lines that have the same color arrangement in the horizontal direction, data pieces corresponding to four lines are necessary.

As buffering of one horizontal line requires

1/166 MHz×2048 pixels=0.012 msec, buffering of four horizontal lines requires 0.012 msec×4 lines=0.048 msec.

At time t302, the reduction circuit 101 starts outputting a second reduced image of the input image 1 to the storage circuit 102 and the selection circuit 103. A period from t300 to t302 is approximately 0.384 msec (=0.012×32). As the second reduced image is an image obtained by reducing the input image to 1/16 in each of the horizontal and vertical directions, the reduction circuit 101 needs to wait until all data pieces corresponding to 32 horizontal lines are prepared in the internal buffer for the purpose of reduction in the vertical direction.

At time t303, the reduction circuit 101 starts outputting a third reduced image of the input image 1 to the storage circuit 102 and the selection circuit 103. A period from t300 to t303 is approximately 6.144 msec (=0.012×512). As the third reduced image is an image obtained by reducing the input image to 1/256 in each of the horizontal and vertical directions, the reduction circuit 101 needs to wait until all data pieces corresponding to 512 horizontal lines are prepared in the internal buffer for the purpose of reduction in the vertical direction.

As the high image quality mode has been set, with regard to all of the first to the third reduced images, the selection circuit 103 selects the reduced images of the input image 1 that are output from the reduction circuit 101, and starts outputting them to the hierarchical processing circuit 110. After processing of the hierarchical processing circuit 110 and the development circuit 108, the output circuit 109 starts outputting an output image 1 corresponding to the input image 1 at time t304.

In the high image quality mode, a period required from time t300, at which inputting of an input image corresponding to one frame is started, to time t304, at which the output circuit 109 starts outputting the input image, is a period until the generation of the third reduced image with the highest reduction rate is started, that is to say, approximately 6.144 msec. Also, a period of processing of the hierarchical processing circuit 110 and the development circuit 108 is equivalent to a period from time t303 to time t304, which is sufficiently short compared to the period from time t300 to time t303. In the present embodiment, it is assured that processing cycles of the hierarchical processing circuit 110 are 80 cycles, and processing cycles of the development circuit 108 are 20 cycles. It is also assumed that 1 cycle corresponds to 6 clocks.

Provided that the operation clock frequency of the hierarchical processing circuit 110 and the development circuit 108 is 100 MHz, a period of processing of the hierarchical processing circuit 110 is 480 nsec, and a period of processing of the development circuit 108 is 120 nsec. The sum of the processing periods is 0.6 μsec, which is sufficiently short compared to 6.144 msec.

As described above, in the high image quality mode, although there is a latency of approximately 6 msec front the start of inputting of the input image 1 to the end of the development processing, the highest processing accuracy is achieved as all of the first to the third reduced images are generated from the current input image. In the present embodiment, this mode generates the composite gain map with the highest accuracy, and thus achieves the highest accuracy in tone mapping for the current input image, than other modes.

Next, the operations of the image processing apparatus 100 for a case where the low latency mode 1 has been set will be described using FIG. 2B. It is assumed that input images and the processing capability of the image processing apparatus 100 are the same as when the high image quality mode has been set. The low latency mode 1 is a mode in which small latency is given utmost priority.

Inputting of an input image 1 to the image processing apparatus 100 is started from time t300. The input image 1 is input to the reduction circuit 101 and the hierarchical processing circuit 110. The reduction circuit 101 starts generating reduced images. When the low latency mode 1 has been set, with regard to the first frame of the input images (the input image 1), the hierarchical processing circuit 110 does not perform hierarchical processing, and supplies the input image 1 as is to the development circuit 108. Note that the input image 1 may be output to the development circuit 108 after the gain processing circuit 107 has applied thereto composite gains that do not influence the input image 1. Alternatively, the input image 1 may be input directly to the development circuit 108 without being input to the hierarchical processing circuit 110. As a result, outputting of an output image 1 corresponding to the input image 1 is started from time t305.

The reduction circuit 101 starts outputting first to third reduced images of the input image 1 at times t301, t302, and t303, respectively, to the storage circuit 102 and the selection circuit 103.

Thereafter, at time t306 that precedes time t307 at which inputting of the next frame (an input image 2) is started, the selection circuit 103 starts outputting the first to the third reduced images generated from the input image 1, which have been stored in the storage circuit 102, to the hierarchical processing circuit 110. The hierarchical processing circuit 110 starts hierarchical processing that uses the first to the third reduced images of the input image 1.

Thereafter, inputting of the input image 2 to the image processing apparatus 100 is started from time t307. The gain processing circuit 107 applies a composite gain map that has been generated using the first to the third reduced images of the input image 1 to the input image 2, and outputs the resultant input image 2 to the development circuit 108. Also, the development circuit 108 starts development processing with respect to the input image 2 to which gain processing has been applied. After processing of the hierarchical processing circuit 110 and the development circuit 108, the output circuit 109 starts outputting an output image 2 corresponding to the input image 2 at time t308.

A period from t307 to t308, namely from when the input image 2 is input to when the output image 2 is output, is extremely short similarly to a period from t300 to t305, namely from when the input image 1 is input to when the output image 1 is output. This is because hierarchical processing for generating the composite gain map to be applied to the input image 2 is started using the first to the third reduced images of the input image 1 at a time point before the star of inputting of the input image 2. In the low latency mode 1, the processing latency corresponding to the current input image can be minimized by using reduced images of an image that was input before the current input image for all of a plurality of reduced images used in hierarchical processing. On the other hand, the accuracy of hierarchical processing is lower than that in the high image quality mode and the low latency modes 2, 3.

Next, the operations of the image processing apparatus 100 for a case where the low latency mode 2 has been set will be described using FIG. 2C. It is assumed that input images and the processing capability of the image processing apparatus 100 are the same as when the high image quality mode has been set. The low latency mode 2 is a mode that has the next smallest latency after the low latency mode 1.

Inputting of an input image 1 to the image processing apparatus 100 is started from time t300. The input image 1 is input to the reduction circuit 101 and the hierarchical processing circuit 110. The reduction circuit 101 starts generating reduced images. Unlike the low latency mode 1, when the low latency mode 2 has been set, the hierarchical processing circuit 110 performs hierarchical processing with respect to the first frame of the input images (the input image 1).

At time t301, the reduction circuit 101 starts outputting a first reduced image of the input image 1 to the storage circuit 102 and the selection circuit 103. When the low latency mode 2 has been set, with regard to the first frame of the input images (the input image 1), the hierarchical processing circuit 110 executes hierarchical processing using only the first reduced image. As a result, outputting of an output image 1 corresponding to the input image 1 for which development processing of the development circuit 108 has been completed is started from time t309 that precedes time t302 at which the reduction circuit 101 starts outputting a second reduced image of the input image 1.

Thereafter, the reduction circuit 101 starts outputting the second and the third reduced images of the input image 1 at times t302 and t303, respectively, to the storage circuit 102 and the selection circuit 103.

Inputting of the next frame (an input image 2) is started from time t307, and the reduction circuit 101 starts outputting a first reduced image of the input image 2 at time t310. The selection circuit 103 starts outputting the first reduced image of the input image 2, as well as the second and the third reduced images generated from the input image 1, which have been stored in the storage circuit 102, to the hierarchical processing circuit 110. The hierarchical processing circuit 110 starts hierarchical processing that uses the first reduced image of the input image 2 and the second and the third reduced images of the input image 1.

Then, the output circuit 109 starts outputting an output image 2, for which hierarchical processing of the hierarchical processing circuit 110 and development processing of the development circuit 108 have been completed, from time t311.

In the low latency mode 2, a period from t307 to t311, namely from when the input image 2 is input to when the output image 2 is output, is approximately 0.024 msec. A period from time t310 to time t311 is a period of processing of the hierarchical processing circuit 110 and the development circuit 108, which is a sufficiently short period as stated earlier.

In the low latency mode 2, a reduced image generated from the current input image and reduced images generated from a past image are respectively used as a reduced image with the smallest reduction rate (here, 1/2) and reduced images with larger reduction rates among a plurality of reduced images used in hierarchical processing. Therefore, latency is small compared to the high image quality mode, and hierarchical processing can be realized with high accuracy compared to the low latency mode 1.

Figure 2D:
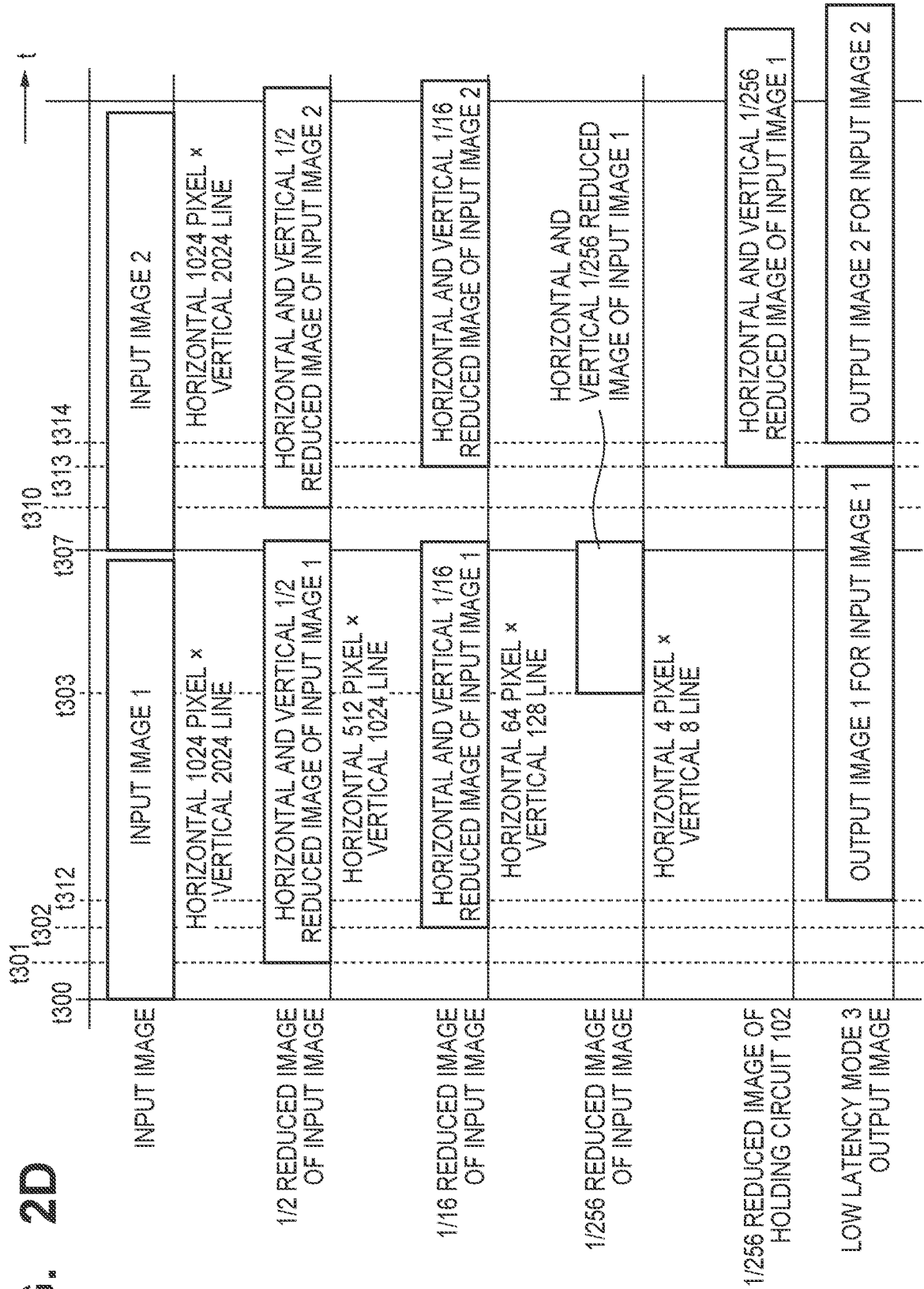

Next, the operations of the image processing apparatus 100 for a case where the low latency mode 3 has been set will be described using FIG. 2D. It is assumed that input images and the processing capability of the image processing apparatus 100 are the same as when the high image quality mode has been set. The low latency mode 3 is a mode that has the next smallest latency after the low latency mode 2.

Inputting of an input image 1 to the image processing apparatus 100 is started from time t300. The input image 1 is input to the reduction circuit 101 and the hierarchical processing circuit 110. The reduction circuit 101 starts generating reduced images.

The reduction circuit 101 starts outputting first and second reduced images of the input image 1 at times t301 and t302, respectively, to the storage circuit 102 and the selection circuit 103. When the low latency mode 3 has been set, with regard to the first frame of the input images (the input image 1), the hierarchical processing circuit 110 executes hierarchical processing using only the first and the second reduced images. As a result, outputting of an output image 1 corresponding to the input image 1 for which development processing of the development circuit 108 has been completed is started from time t312 that precedes time t303 at which the reduction circuit 101 starts outputting a third reduced image of the input image 1.

Thereafter, at time t303, the reduction circuit 101 starts outputting the third reduced image of the input image 1 to the storage circuit 102 and the selection circuit 103.

Inputting of the next frame (an input image 2) is started from time t307, and the reduction circuit 101 starts outputting a first reduced image of the input image 2 at time t310. Also, the selection circuit 103 outputs the first reduced image of the input image 2 to the hierarchical processing circuit 110. Thereafter, the reduction circuit 101 starts outputting a second reduced image of the input image 2 at time t313, and the selection circuit 103 starts outputting the second reduced image of the input image 2, as well as the third reduced image generated from the input image 1, which has been stored in the storage circuit 102, to the hierarchical processing circuit 110. The hierarchical processing circuit 110 starts hierarchical processing that uses the first and the second reduced images of the input image 2 and the third reduced image of the input image 1.

Then, the output circuit 109 starts outputting an output image 2, for which hierarchical processing of the hierarchical processing circuit 110 and development processing of the development circuit 108 have been completed, from time t314.

In the low latency mode 3, a period from t307 to t314, namely from when the input image 2 is input to when the output image 2 is output, is approximately 0.384 msec. A period from time t313 to time t314 is a period of processing of the hierarchical processing circuit 110 and the development circuit 108, which is a sufficiently short period as stated earlier.

In the low latency mode 3, reduced images generated from the current input image are used as a reduced image with the smallest reduction rate (here, 1/2) and a reduced image with the next smallest reduction rate (here, 1/16) among a plurality of reduced images used in hierarchical processing. Meanwhile, a reduced image generated from a past image is used as a reduced image with a larger reduction rate. Therefore, latency is small compared to the high image quality mode, and hierarchical processing can be realized with high accuracy compared to the low latency mode 2.

Figure 3:
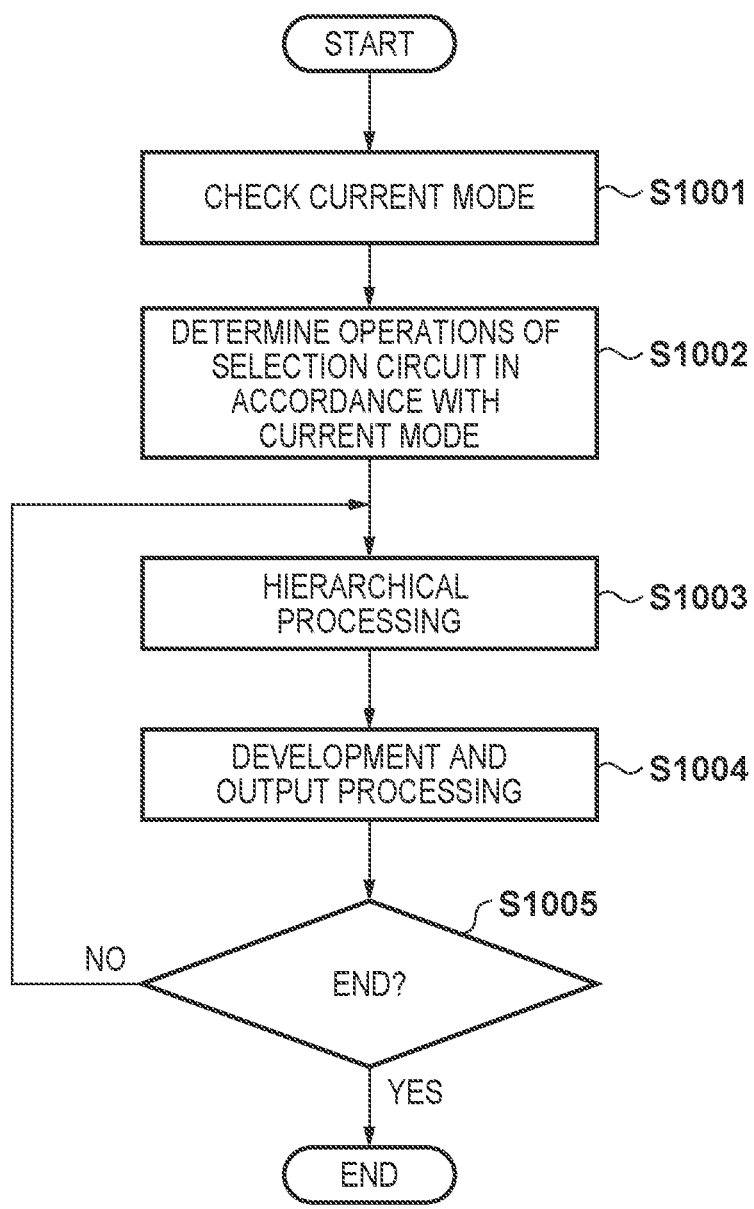
FIG. 3 is a flowchart related to the operations of the image processing apparatus according to the first embodiment.

FIG. 3 is a flowchart showing the operations of the image processing apparatus 100 described using FIG. 2A to FIG. 2D. These operations can be started at any timing before the start of hierarchical processing in the image processing apparatus 100.

In step S1001, the image processing apparatus 100 checks a mode that has been set (i.e., checks the current mode). The mode may be settable by, for example, a user via an input apparatus included in the image processing apparatus 100 or an electronic device on which the image processing apparatus 100 is mounted. Alternatively, for example, a mode corresponding to the settings of the electronic device on which the image processing apparatus 100 is mounted may be set. For example, when the electronic device is an image capturing apparatus, a mode corresponding to an image capturing mode that has been set on the image capturing apparatus may be set.

In step S1002, the image processing apparatus 100 determines the operations of the selection circuit 103 in accordance with the set mode. Specifically, with regard to each of the first to the third reduced images, the image processing apparatus 100 determines which is to be output from the selection circuit 103 to the hierarchical processing circuit 110: a reduced image that has been generated with respect to the current input image, or a reduced image that has been generated with respect to a past image and stored in the storage circuit 102.

Once inputting of image data has been started, the image processing apparatus 100 executes hierarchical processing corresponding to the set mode, development processing, and output processing in steps S1003 and S1004 as has been described using FIGS. 2A to 2D.

In step S1005, the image processing apparatus 100 determines whether an ending condition is satisfied. For example, the image processing apparatus 100 can determine that the ending condition is satisfied when inputting of image data has ended or when an ending instruction from a user has been detected. When the image processing apparatus 100 determines that the ending condition is satisfied, it ends processing shown in the flowchart of FIG. 3. On the other hand, when the image processing apparatus 100 does not determine that the ending condition is satisfied, it repeatedly executes hierarchical processing of step S1003 and development and output processing of step S1004 with respect to input image data.

As described above, according to the present embodiment, the image processing apparatus that executes hierarchical processing using an input image and reduced images thereof utilizes a reduced image that has been generated from a past input image; in this way, hierarchical processing can be executed at high speed. Therefore, the image processing apparatus according to the present embodiment can be favorably utilized when importance is placed on the real-time property of processing in an intended use. Furthermore, the rate at which reduced images generated from a past input image are used as reduced images used in hierarchical processing is variable; thus, appropriate hierarchical processing can be applied in accordance with, and in consideration of, which of the real-time property of processing and the accuracy of hierarchical processing is given priority.

Second Embodiment

Next, a second embodiment of the present invention will be described. FIG. 4 is a block diagram showing an example of a functional configuration of an image processing apparatus 400 according to the second embodiment. In FIG. 4, functional blocks that are similar to those of the image processing apparatus 100 described in the first embodiment are given the same reference numerals as in FIG. 1, and the description thereof is omitted.

In the present embodiment, the operations of the selection circuit 103 corresponding to a mode that has been set are similar to those of the first embodiment. On the other hand, the present embodiment differs from the first embodiment in switching among modes dynamically, and in generating a composite gain map so as to alleviate the influence caused by the difference from a current input image when hierarchical processing uses a reduced image of a past input image stored in the storage circuit 102.

First, a description is given of dynamic switching among modes. For example, when the image processing apparatus 400 is typically mounted on an image capturing apparatus, input images are not limited to moving images, and may be still images. When the image processing apparatus 400 mounted on the image capturing apparatus processes moving images, the processed images are often displayed on a display apparatus included in the image capturing apparatus, and thus it is not desirable that processing latency change significantly halfway through. Therefore, with regard to moving images, a mode that is set on the selection circuit 103 is fixed from the start to the end of inputting thereof. On the other hand, when a still image is captured during capturing of moving images, it is desirable that the image quality be high, rather than latency being short, with regard to the captured still image. Therefore, with regard to a still image, hierarchical processing is executed in the high image quality mode.

Next, a description is given of the operations of a compositing circuit 406 for a case where a reduced image generated from a past input image is used. The image processing apparatus 400 according to the present embodiment includes a positional displacement detection circuit 407 that detects a positional displacement between a current input image and a past input image corresponding to reduced images stored in the storage circuit 102.

The positional displacement detection circuit 407 includes a memory for holding input images, and detects the magnitude of a positional displacement between a past input image that served as a basis for reduced images stored in the storage circuit 102 (e.g., an input image that precedes a current input image by one frame) and the current input image. Alternatively, it detects the magnitude of a positional displacement between a past input image that served as a basis for reduced images stored in the storage circuit 102 and an older past input image (e.g., an input image that further precedes by one frame). The latter detection is performed when a period required for positional displacement detection processing cannot be ignored.

The method of detecting a positional displacement is not limited in any particular way, and any known method can be used there as. The positional displacement detection circuit 407 can obtain the magnitude of motion between images as a displacement amount by using, for example, a motion vector detection technique that uses pattern matching.

When a mode other than the high image quality mode that does not use reduced images generated from a past input image has been set, the compositing circuit 406 generates a composite gain map by compositing together first to third enlarged gain maps in accordance with composite rates corresponding to the magnitude of a positional displacement detected by the positional displacement detection circuit 407. Although the specific method of calculation of composite rates will be described later, the compositing circuit 406 maximizes (does not reduce) the composite rate of an enlarged gain map based on a reduced image generated from a current input image, and reduces the composite rate of an enlarged gain map based on a reduced image generated from a past input image.

Figure 5A:
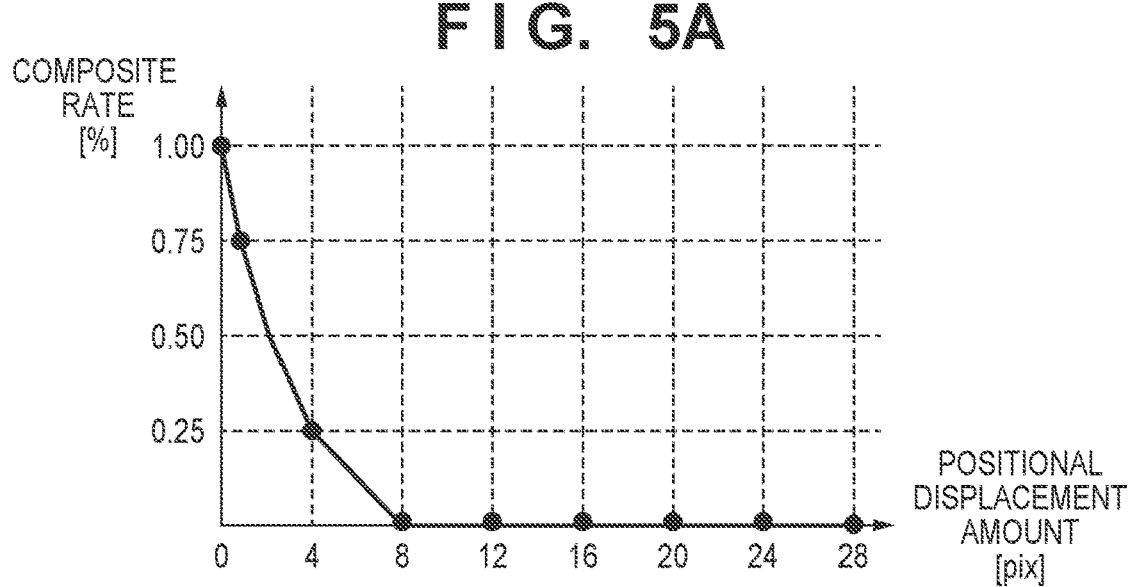
FIG. 5A to FIG. 5C are diagrams showing examples of a composite rate corresponding to a positional displacement according to the second embodiment.
Figure 5B:
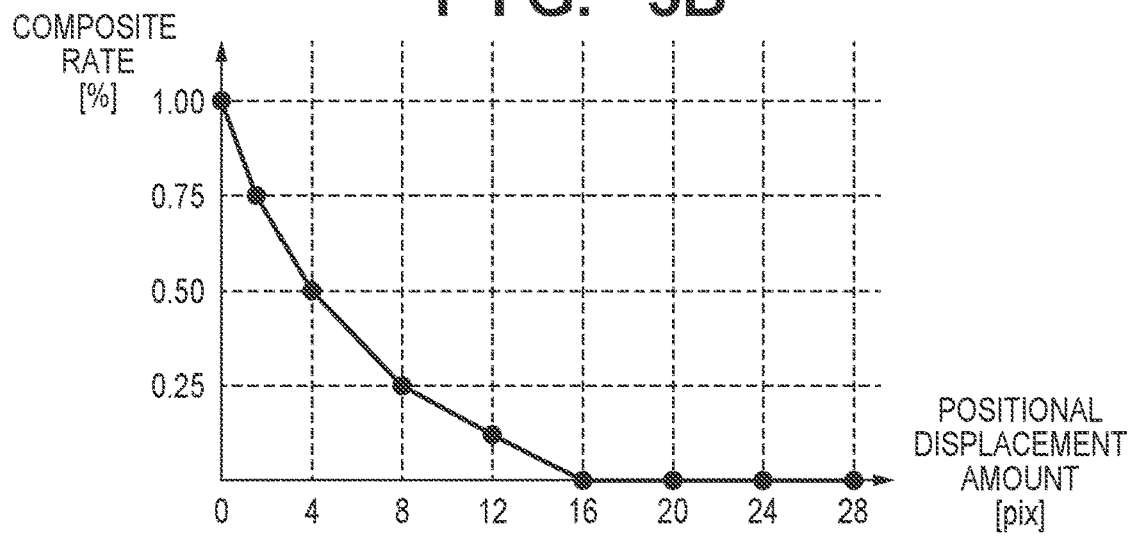
Figure 5C:
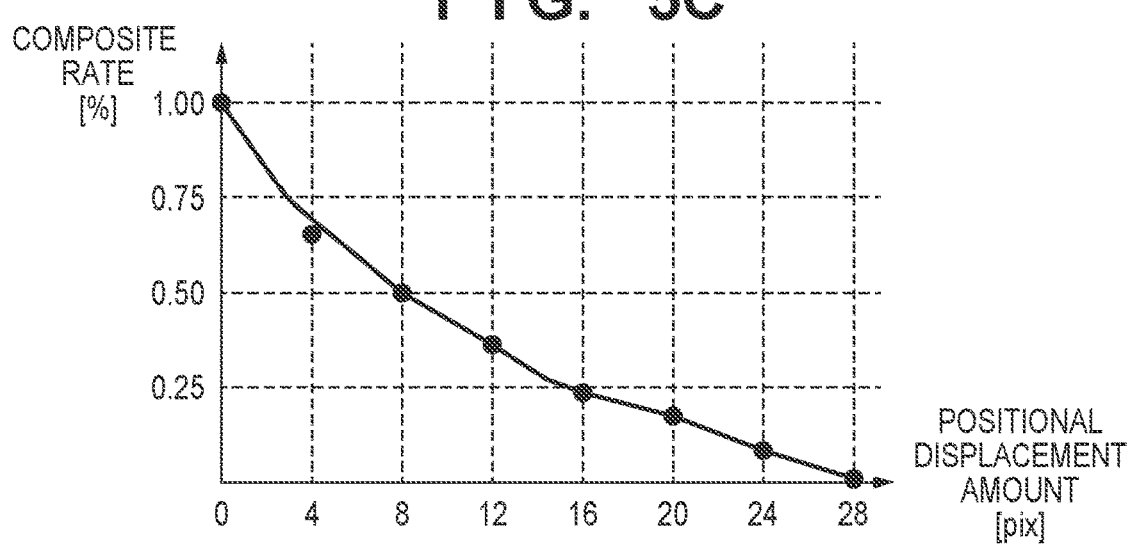

FIGS. 5A to 5C show examples of a relationship between the positional displacement amount detected by the positional displacement detection circuit 407 and the composite rate of an enlarged gain map. FIG. 5A, FIG. 5B, and FIG. 5C respectively show an example of the composite rate of the first enlarged gain map, the second enlarged gain map, and the third enlarged gain map. In any of these, the composite rate decreases as the positional displacement amount increases (note that when the composite rate has hit 0 at a predetermined positional displacement amount, the composite rate stays at 0 and does not decrease even if the positional displacement amount further increases).

The maximum composite rate is 1 (100%), and the minimum composite rate is 0 (0%). Therefore, an enlarged gain map with a composite rate of 0 is not practically reflected in a composite gain map. In the examples shown in FIG. 5A to FIG. 5C, when the positional displacement amount is 8 pixels or more, the first enlarged gain map is not reflected in the composite gain map. Also, when the positional displacement amount is 16 pixels or more, the second enlarged gain map is not reflected in the composite gain map, either. This is because an enlarged gain map based on a reduced image with a higher reduction rate (a smaller reduced image) is more easily influenced by a positional displacement.

Note that the specific relationships between the positional displacement amount and the composite rate shown in FIG. 5A to FIG. 5C are merely exemplary, and the composite rate may be determined based on other relationships. However, the following relationship should be satisfied: with an increase in the positional displacement amount, the composite rate corresponding to the positional displacement for the first reduced image decreases to a larger extent than the composite rate corresponding to the positional displacement amount for the second reduced image that is smaller than the first reduced image.

The relationships between the positional displacement amount and the composite rates of respective enlarged gain maps can be stored in, for example, the compositing circuit 406 in advance. A description is now given of a specific example of calculation of composite rates in the compositing circuit 406 based on the relationships of FIG. 5A to FIG. 5C for a case where the positional displacement amount detected by the positional displacement detection circuit 407 is 8 pixels.

In the first to the third enlarged gain maps, an initial value of the composite rate (the original composite rate), which is irrelevant to the positional displacement amount, is set on a per-mode basis. As stated earlier, with regard to an enlarged gain map based on a reduced image generated from a current input image, the original composite rate is 1 (100%). On the other hand, values smaller than 1 (100%) are stored in the compositing circuit 406 in advance for respective modes, and for respective enlarged gain maps, as the original composite rates of enlarged gain maps based on reduced images generated from a past input image. With regard to the enlarged gain maps based on the reduced images generated from the past input image, an enlarged gain map based on a reduced image with the smallest reduction rate is set to have the largest original composite rate. The remaining enlarged gain maps can be set to satisfy the relationship represented by the original composite rate 1 for the reduction rate 1≥the original composite rate 2 for the reduction rate 2 under the relationship represented by the reduction rate 1<the reduction rate 2.

For example, in the case of the low latency mode 1, the original composite rate of the first enlarged gain map can be 0.5 (50%), and the original composite rates of the second and the third enlarged gain maps can each be 0.25 (25%). The original composite rate of the second enlarged gain map may be larger than the original composite rate of the third enlarged gain map.

The compositing circuit 406 determines final composite rates by obtaining the value of the product of the original composite rate and the composite rate corresponding to the positional displacement amount for each enlarged gain map, and by normalizing each value so that the sum of the values obtained for respective enlarged gain maps is 1 (100%).

In the aforementioned examples, with regard to the first enlarged gain map, as the original composite rate is 0.5 and the composite rate corresponding to the positional displacement amount is 0, the final composite rate before normalization is 0.5×0=0 (0%).

With regard to the second enlarged gain map, as the original composite rate is 0.25 and the composite rate corresponding to the positional displacement amount is 0.25, the final composite rate before normalization is 0.25×0.25=0.0625 (6.25%).

With regard to the third enlarged gain map, as the original composite rate is 0.25 and the composite rate corresponding to the positional displacement amount is 0.5, the final composite rate before normalization is 0.25×0.5=0.125 (12.5%).

The sum of the final composite rates before normalization is 0+0.0625+0.125=0.1875. By normalizing the composite rates of respective enlarged gain maps so that this sum becomes equal to 1, the following is obtained.

The first enlarged gain map:

0/0.1875=0(0%)

The second enlarged gain map:

0.0625/0.1875=0.333(33%)

The third enlarged gain map:

0.125/0.1875=0.666(67%)

Thus, the compositing circuit 406 generates the composite gain map based on the values of the second enlarged gain map×0.33+the values of the third enlarged gain map×0.67. Specifically, the con positing circuit 406 generates the composite gain map by using the result of performing weighted addition of the values of corresponding elements in the second and the third enlarged gain maps as the value of a corresponding element in the composite gain map.

The operations of the image processing apparatus 400 according to the present embodiment will be described using a timing chart of FIG. 6, especially with a focus on the operations of the positional displacement detection circuit 407 and the compositing circuit 406. It is assumed here that input images are moving images, similarly to the first embodiment, and the low latency mode 2 has been set. Therefore, a reduced image output from the reduction circuit 101 and past reduced images stored in the storage circuit 102 are used in hierarchical processing respectively as the first reduced image and the second and the third reduced images among the first to the third reduced images.

It is also assumed that the positional displacement detection circuit 407 detects a positional displacement between input images that precede a current input image by one frame and two frames, respectively. Therefore, in the timing chart of FIG. 6, a composite gain map that reflects a positional displacement is generated fir the first time in hierarchical processing for an input image 3.

Figure 6:
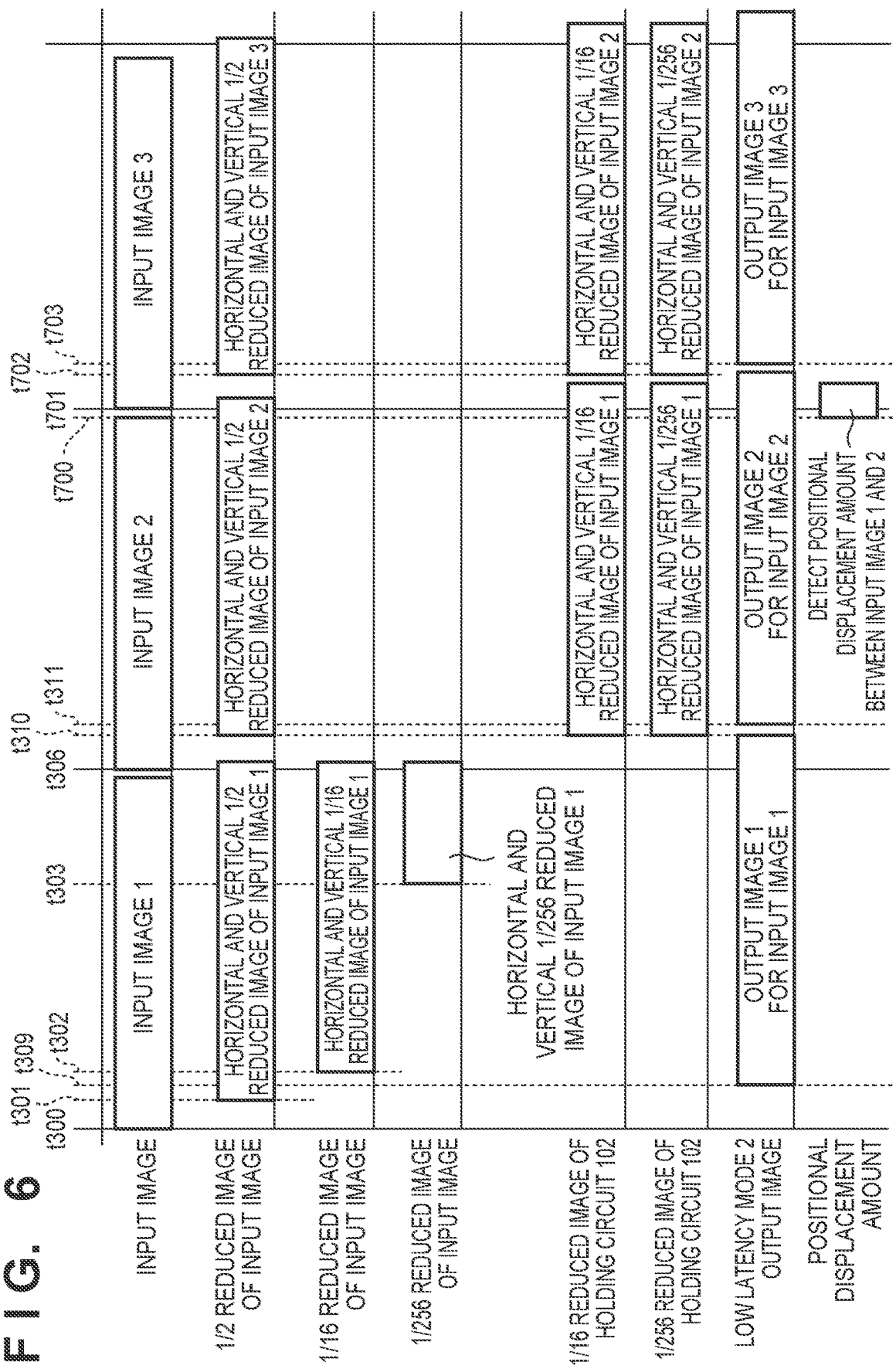
FIG. 6 is a timing chart of the image processing apparatus according to the second embodiment.

In FIG. 6, the operations at times t300, t301, t302, t303, t306, t310, t311, t309 are similar to those in the first embodiment described using FIG. 2C, except that input images are input also to the positional displacement detection circuit 407, and thus the description thereof is omitted.

Upon completion of inputting of an input image 2 at time t700, the positional displacement detection circuit 407 starts positional displacement detection processing for an input image 1 and the input image 2.

Thereafter, inputting of the input image 3 to the image processing apparatus 400 is started from time t702. The input image 3 is input to the reduction circuit 101, a hierarchical processing circuit 410, and the positional displacement detection circuit 407, and the reduction circuit 101 starts generating reduced images.

Before the start of inputting of first to third reduced images to the hierarchical processing circuit 410 at time t703, the positional displacement detection circuit 407 completes the detection of a positional displacement amount, and notifies the compositing circuit 406 of the detected positional displacement amount. Note that in reality, if the detection of the positional displacement amount is completed before the enlargement circuit 105 finishes the generation of enlarged gain maps, an increase in latency caused by the detection of the positional displacement amount can be avoided.

As stated earlier, the compositing circuit 406 calculates the final composite rates of respective enlarged gain maps from the original composite rates corresponding to the set mode and the composite rates corresponding to the positional displacement amount. Then, a composite gain map is generated by applying the calculated composite rates to the enlarged gain maps supplied from the enlargement circuit 105. A gain processing circuit 408 applies processing based on the composite gain map (here, tone mapping processing) to the input image 3, and outputs the resultant input image 3 to the development circuit 108. Once development processing of the development circuit 108 has been ended, the output circuit 109 starts outputting an output image 3 from time t703.

Note that as stated earlier, when the high image quality mode has been set, a reduced image generated from a past input image is not used, and thus the operations of the image processing apparatus 400 are the same as the operations of the image processing apparatus 100 described in the first embodiment.

Figure 7:
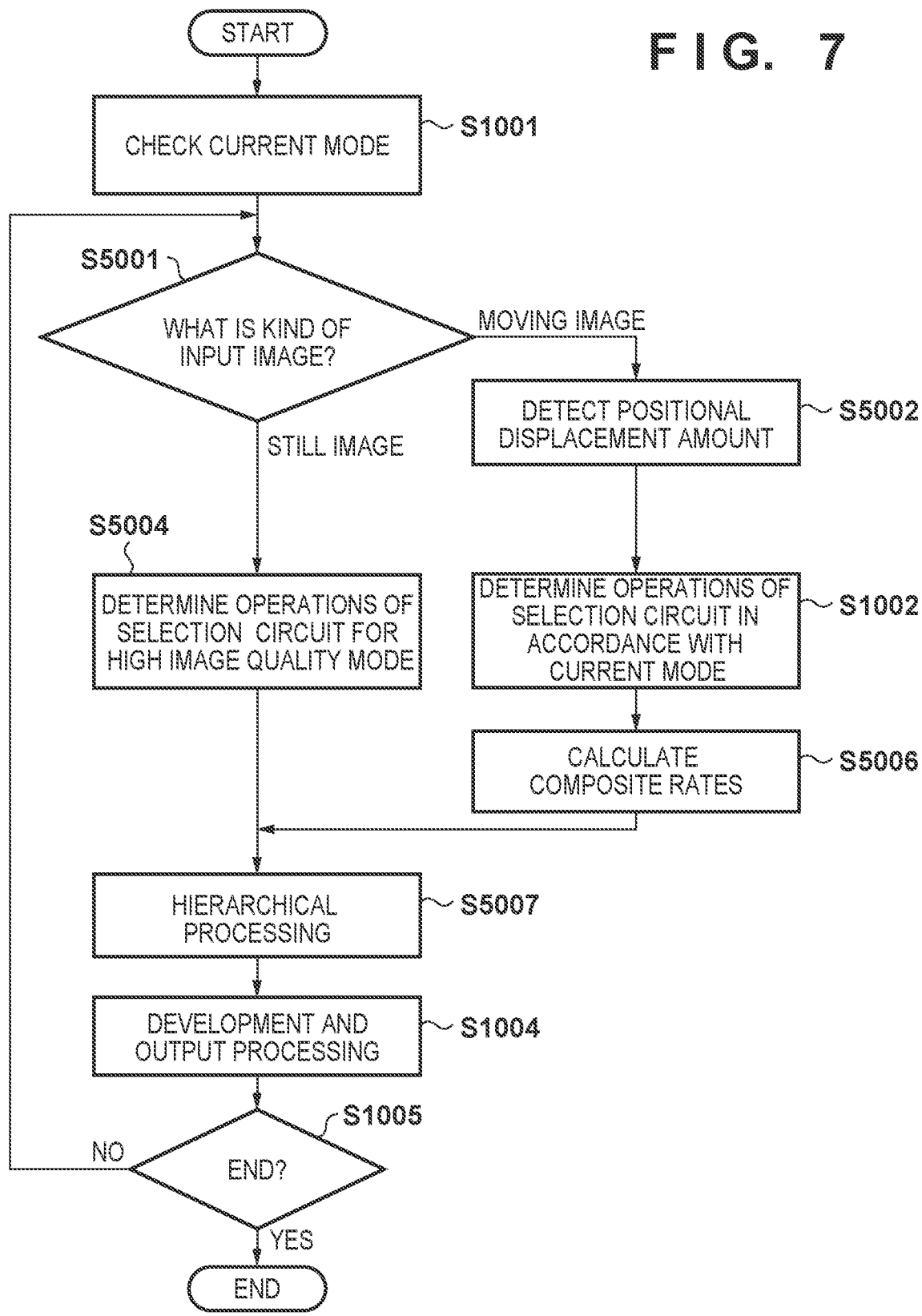
FIG. 7 is a flowchart related to the operations of the image processing apparatus according to the second embodiment.

FIG. 7 is a flowchart showing the operations of the image processing apparatus 100 described using FIG. 4 to FIG. 6. These operations can be started at any timing before the start of hierarchical processing in the image processing apparatus 400. In FIG. 7, processing steps that are similar to those of the first embodiment are given the same reference numerals as in FIG. 3, and an overlapping description is omitted.

In step S1001, the image processing apparatus 400 confirms a mode that has been set.

Once inputting of image data has been started, the image processing apparatus 400 distinguishes whether an input image is a moving image or a still image in step S5001, and executes step S5002 when the input image is distinguished as the moving image and step S5004 when the input image is distinguished as the still image. The method of distinction between the moving image and the still image is not limited in any particular way, and the distinction may be made based on, for example, the resolution. Also, in a case where the image processing apparatus 400 is mounted on an image capturing apparatus, when in a state of standby for capturing of a still image, the input image can be distinguished as a moving image for EVF display. Furthermore, the input image can be distinguished as a still image when a shutter button has been depressed, and as a moving image when a moving image capturing button has been depressed.

In step S5002, the positional displacement detection circuit 407 starts detecting a positional displacement amount between an input image corresponding to the second or subsequent frame and an input image corresponding to an immediately previous frame.

In step S1002, the image processing apparatus 400 determines the operations of a selection circuit 403 in accordance with the set mode.

In step S5006, the compositing circuit 406 calculates the composite rates of respective enlarged gain maps from the original composite rates corresponding to the set mode and the composite rates corresponding to the positional displacement amount detected by the positional displacement detection circuit 407.

In step S5004, the image processing apparatus 400 determines the operations of the high image quality mode as the operations of the selection circuit 403. In this way, hierarchical processing that places utmost priority on the image quality is applied to the still image.

In step S5007, the hierarchical processing circuit 410 executes hierarchical processing in a manner similar to step S1003, except that the compositing circuit 406 uses the composite rates that were calculated in step S5006 in generating a composite gain map.

In step S1004, development processing of the development circuit 108 and output processing of the output circuit 109 are executed.

In step S1005, the image processing apparatus 400 determines whether an ending condition is satisfied. When the image processing apparatus 400 determines that the ending condition is satisfied, it ends processing shown in the flowchart of FIG. 7. On the other hand, when the image processing apparatus 400 does not determine that the ending condition is satisfied, it repeatedly executes processing from step S5001 with respect to input image data.

As described above, according to the present embodiment, when the image processing apparatus that executes hierarchical processing using an input image and reduced images thereof utilizes a reduced image that has been generated from a past input image, hierarchical processing in which the influence of a positional displacement from a current input image has been alleviated is performed. Therefore, hierarchical processing with higher accuracy can be realized in addition to the advantageous effects of the first embodiment. Furthermore, with respect to an input image for which latency need not be reduced, as with a still image, even when a mode that reduces latency has been set, hierarchical processing is executed in a mode that places utmost priority on the image quality. Therefore, even when moving images and still images are coexistent in input images, hierarchical processing that is appropriate for still images can be executed automatically.

Other Embodiments

Embodiment(s) of the present invention can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239280, filed on Dec. 27, 2019, which is hereby incorporated by reference herein in its entirety.

What is claimed is:

1. An image processing apparatus comprising:
  at least one processor and/or circuit configured to function as following units:
  a reduction unit configured to generate a plurality of reduced images with different reduction rates from an input image;

a storage unit configured to store one or more of a plurality of reduced previous images generated by the reduction unit from a previous input image that precedes the input image;

a processing unit configured to apply processing to the input image based on composite data that is obtained by compositing plural pieces of enlarged data, wherein the plural pieces of enlarged data are obtained by applying predetermined processing to the plurality of reduced images with different reduction rates generated from the input image and then converting into their respective original resolutions; and a selection unit configured to output, depending on a setting, either (i) the plurality of reduced images generated from the input image or (ii) the plurality of reduced images generated from the input image one or more of which is/are replaced with one or more reduced previous images stored in the storage unit, to the processing unit.

2. The image processing apparatus according to claim 1, wherein when the setting is a setting that places priority on image quality, the selection unit outputs the plurality of reduced images generated from the input image to the processing unit.

3. The image processing apparatus according to claim 1, wherein when the setting is a setting that places priority on low latency, the selection unit outputs the plurality of reduced images generated from the input image one or more of which is/are replaced with one or more reduced previous images stored in the storage unit to the processing unit.

4. The image processing apparatus according to claim 1, wherein in a case of a second setting that places more priority on low latency than a first setting, the selection unit outputs the plurality of reduced images generated from the input image a larger number of which are replaced with one or more reduced previous images stored in the storage unit than in a case of the first setting to the processing unit.

5. The image processing apparatus according to claim 1, wherein the at least one processor and/or circuit is configured to further function as:

a detection unit configured to detect an amount of a positional displacement between input images, and the processing unit generates the composite data so as to alleviate an influence of the amount of the positional displacement.

6. The image processing apparatus according to claim 5, wherein the processing unit includes a compositing unit configured to composite together the plurality of pieces of enlarged data based on composite rates, and the compositing unit determines the composite rates of the respective plurality of pieces of enlarged data from composite rates corresponding to the setting and composite rates corresponding to the amount of the positional displacement.

7. The image processing apparatus according to claim 6, wherein for enlarged data based on a reduced image generated from the input image, a composite rate corresponding to the setting is 1.

8. The image processing apparatus according to claim 6, wherein for enlarged data based on a reduced image stored in the storage unit, a composite rate corresponding to the setting is smaller than 1.

9. The image processing apparatus according to claim 5, wherein a composite rate corresponding to the amount of the positional displacement decreases as the amount of the positional displacement increases.

10. The image processing apparatus according to claim 9, wherein with an increase in the amount of the positional displacement, a composite rate corresponding to the amount of the positional displacement for a first reduced image decreases to a larger extent than a composite rate corresponding to the amount of the positional displacement for a second reduced image that is smaller in size than the first reduced image.

11. The image processing apparatus according to claim 1, wherein when the input image is a still image, the selection unit outputs the plurality of reduced images generated from the input image to the processing unit irrespective of the setting.

12. An image processing method executed by an image processing apparatus, the image processing method comprising:

generating a plurality of reduced images with different reduction rates from an input image; and applying processing to the input image based on composite data that is obtained by compositing plural pieces of enlarged data, wherein the plural pieces of enlarged data are obtained by applying predetermined processing to the plurality of reduced images with different reduction rates generated from the input image and then converting into their respective original resolutions, wherein the applying processing to the input image includes controlling to use, depending on a setting, either (i) the plurality of reduced images generated from the input image or (ii) the plurality of reduced images generated from the input image one or more of which is/are replaced with one or more of a plurality of reduced images generated from a previous input image that precedes the input image.

13. A non-transitory computer-readable medium having stored therein a program for causing a computer to function as an image processing apparatus comprising:

a storage unit configured to store one or more of a plurality of reduced previous images generated by the reduction unit from a previous input image that precedes the input image;

a processing unit configured to apply processing to the input image based on composite data that is obtained by compositing plural pieces of enlarged data, wherein the plural pieces of enlarged data are obtained by applying predetermined processing to the plurality of reduced images with different reduction rates generated from the input image and then converting into their respective original resolutions; and a selection unit configured to output, depending on a setting, either (i) the plurality of reduced images generated from the input image or (ii) the plurality of reduced images generated from the input image one or more of which is/are replaced with one or more reduced previous images stored in the storage unit, to the processing unit.

\* \* \* \* \*